United States Patent
Ostertun et al.

(10) Patent No.: US 9,471,792 B2
(45) Date of Patent: Oct. 18, 2016

(54) DETECTION ARRANGEMENT

(71) Applicant: NXP B.V., Eindhoven (NL)

(72) Inventors: Soenke Ostertun, Wedel (DE);
Joachim Christoph Hans Garbe, Neu Wulmstorf (DE)

(73) Assignee: NXP B.V., Eindhoven (NL)

( * ) Notice: Subject to any disclaimer, the term of this patent is extended or adjusted under 35 U.S.C. 154(b) by 342 days.

(21) Appl. No.: 14/010,145

(22) Filed: Aug. 26, 2013

(65) Prior Publication Data

US 2014/0068762 A1  Mar. 6, 2014

(30) Foreign Application Priority Data

Aug. 29, 2012 (EP) .................... 12182221

(51) Int. Cl.
| | | |
|---|---|---|
| G06F 11/22 | (2006.01) | |
| G06F 17/50 | (2006.01) | |
| G06F 21/60 | (2013.01) | |
| G06K 19/073 | (2006.01) | |

(52) U.S. Cl.
CPC ......... *G06F 21/60* (2013.01); *G06K 19/07372* (2013.01)

(58) Field of Classification Search
USPC ........................................................ 716/136
See application file for complete search history.

(56) References Cited

U.S. PATENT DOCUMENTS

| | | | |
|---|---|---|---|
| 6,809,953 B2 | 10/2004 | Toyoda | |
| 7,889,778 B2 * | 2/2011 | Marinet et al. | ............... 375/140 |
| 2011/0025372 A1 * | 2/2011 | Cabanas-Holmen et al. | .... 326/9 |

FOREIGN PATENT DOCUMENTS

| | | |
|---|---|---|
| CN | 1533525 A | 9/2004 |
| EP | 1 582 963 A1 | 10/2005 |

OTHER PUBLICATIONS

Extended European Search Report for Patent Appln. No. 12182221.7 (Feb. 6, 2013).

* cited by examiner

*Primary Examiner* — Eric Lee

(57) ABSTRACT

There is provided a detection arrangement for detecting an attack to internal signals in a semiconductor device. The detection arrangement comprises a first input terminal, a second input terminal, and a comparison unit. The first input terminal is adapted to receive a first signal being indicative for a signal at a first stage of a driver of the semiconductor device, the driver being capable to drive signals internally to the semiconductor device. The second input terminal is adapted to receive a second signal being indicative for a signal at a second stage of the driver of the semiconductor device. The comparison unit is adapted to compare the first signal and the second signal and to determine a time period during which the signals are equal, wherein the determined time period is indicative for a potential attack, if the determined time period is above a predefined threshold.

12 Claims, 2 Drawing Sheets

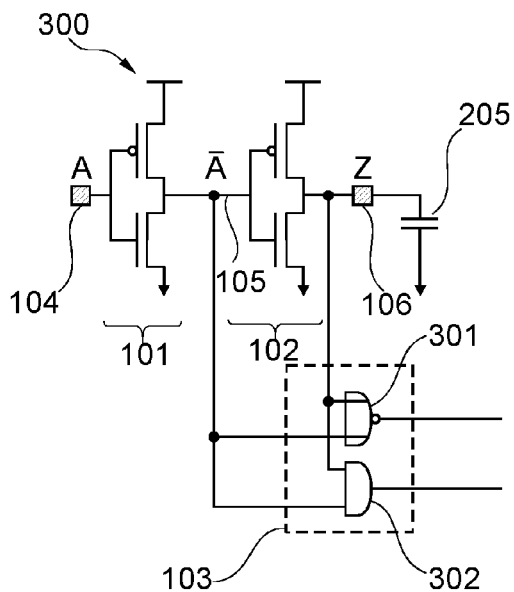
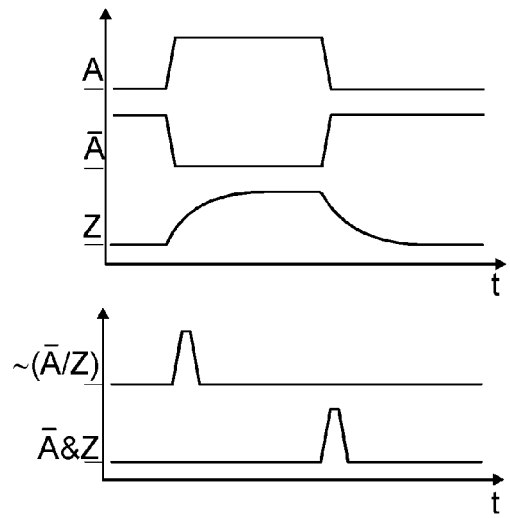
Fig. 3A
Fig. 3B
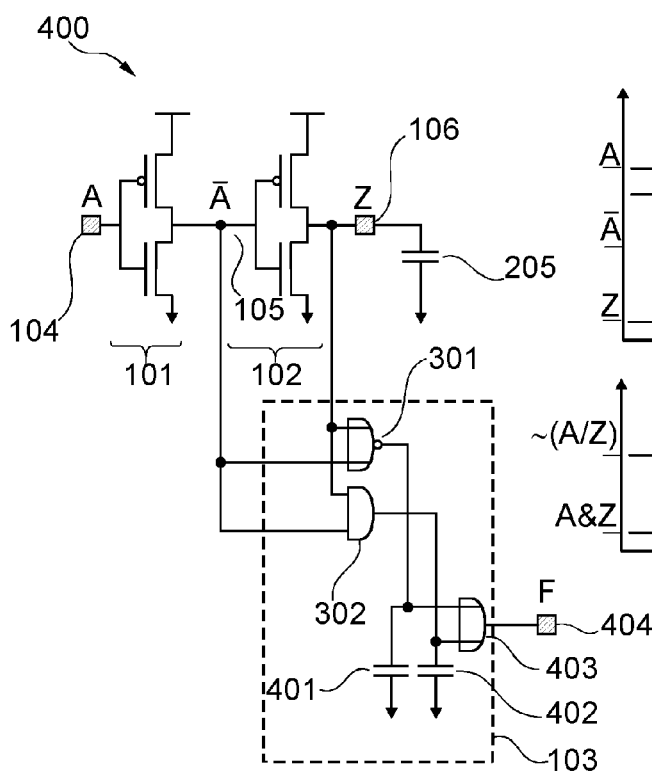
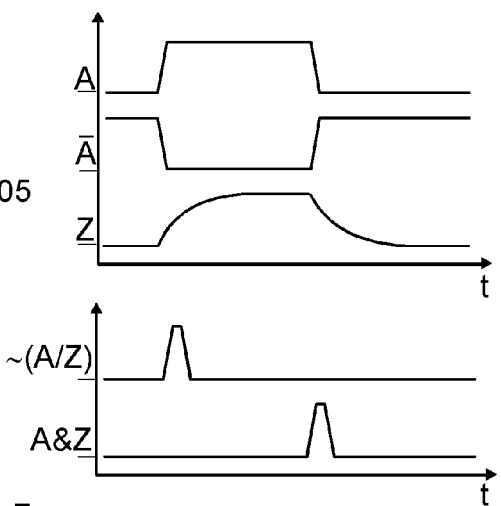
Fig. 4A
Fig. 4B

DETECTION ARRANGEMENT

CROSS-REFERENCE TO RELATED APPLICATIONS

This application claims the priority under 35 U.S.C. §119 of European patent application no. 12182221.7, filed on Aug. 29, 2012, the contents of which are incorporated by reference herein.

FIELD OF THE INVENTION

The invention relates to a detection arrangement for detecting an attack to internal signals in a semiconductor device.

Furthermore, the invention relates to a driving unit comprising the detection arrangement.

Beyond this, the invention relates to a semiconductor device comprising the driving unit.

Moreover, the invention relates to a method of for detecting an attack to internal signals in a semiconductor device.

Further, the invention relates to a computer-readable medium and a program element.

BACKGROUND OF THE INVENTION

Many semiconductor products contain important data which have to be kept secret, like codes for encryption or identification. Examples are chips in banking cards, for ticketing or pay TV applications. Chips which are used in such fields might need to be security certified to prove a certain security standard. Sufficient resistance against all kinds of attacks which aim at retrieval of codes or against uncontrolled change of functionality has to be implemented. Possible attack scenarios can be grouped in sensing attacks and forcing attacks. Sensing attacks are all trials to get the secret information from the chip by measuring certain signals from the chip like current consumption, electromagnetic emission, or voltage probing of signal lines. Forcing attacks try to change the operation conditions and draw conclusions from the resulting behavior of the chip.

Security chips may use several sensors to detect such attack attempts, e.g. checking environmental conditions (like supply voltage, temperature, and light exposure). With the availability of high sophisticated equipment timely resolved probing of single wires of a chip becomes more and more a realistic attack scenario. Also, forcing internal signals at certain time points becomes possible. Some signals are of higher or special interest as they might give access to the most secret information. These are e.g. data busses and wires connected to the latches storing the secret keys. As global sensors are not able to detect such local attacks, these signals need a dedicated protection.

Thus, there may be a need for an improved detection arrangement being capable to detect such local attacks for providing a protection for such signals.

OBJECT AND SUMMARY OF THE INVENTION

It is an object of the invention to provide a detection arrangement and a method for detecting an attack to internal signals in a semiconductor device in order to protect secure information in the semiconductor device.

In order to achieve the object defined above, a detection arrangement, a driving unit, a semiconductor device, a detecting method, a computer-readable medium and a program element according to the independent claims are provided.

According to an exemplary embodiment of the invention, there is provided a detection arrangement for detecting an attack to internal signals in a semiconductor device, the detection arrangement comprising a first input terminal, a second input terminal, and a comparison unit. The first input terminal is adapted to receive a first signal being indicative for a signal at a first stage of a driver of the semiconductor device, the driver being capable to drive signals (e.g. of data busses) internally to the semiconductor device. The second input terminal is adapted to receive a second signal being indicative for a signal at a second stage of the driver of the semiconductor device. The comparison unit is adapted to compare the first signal and the second signal and to determine a time period during which the signals are equal, wherein the determined time period is indicative for a potential attack, if the determined time period is above a predefined threshold.

According to a further exemplary embodiment, there is provided a driving unit for driving signals of data busses internally to a semiconductor device. The driving unit comprises a driver having a first stage corresponding to an internal node between a first inverting unit of the driver and a second inverting unit of the driver and a second stage corresponding to an output node of the driver, and a detection arrangement having the above mentioned features, wherein the first stage and the second stage are connected to the detection arrangement.

According to a further exemplary embodiment, there is provided a semiconductor device. The semiconductor device comprises a driving unit having the above mentioned features, wherein the driving is capable to drive signals being associated with data busses and wires connected to latches of the semiconductor device.

According to a further exemplary embodiment, there is provided a semiconductor device. The semiconductor device comprises the detection arrangement having the above mentioned features.

According to a further exemplary embodiment, there is provided a method of detecting an attack to internal signals in a semiconductor device. The method comprises receiving, by a first input terminal of a detection arrangement, a first signal being indicative for a signal at a first stage of a driver of the semiconductor device, the driver being capable to drive signals (e.g. of data busses) internally to the semiconductor device, receiving, by a second input terminal of the detection arrangement, a second signal being indicative for a signal at a second stage of the driver of the semiconductor device, comparing, by a comparison unit, the first signal and the second signal and determining a time period during which the signals are equal, wherein the determined time period is indicative for a potential attack, if the determined time period is above a predefined threshold.

According to a further exemplary embodiment, a computer-readable medium is provided, in which a computer program of detecting an attack to internal signals in a semiconductor device is stored, which computer program, when being executed by a processor, is adapted to carry out or control a method having the above mentioned features.

According to still another exemplary embodiment, a program element (for instance a software routine, in source code or in executable code) of detecting an attack to internal signals in a semiconductor device is provided, which program element, when being executed by a processor, is adapted to carry out or control a method having the above mentioned features.

Detecting an attack to internal signals in a semiconductor device, which may be performed according to embodiments of the invention, can be realized by a computer program that is by software, or by using one or more special electronic optimization circuits, that is in hardware, or in hybrid form, that is by means of software components and hardware components.

As explained above, many semiconductor products contain important data which have to be kept secret, like codes for encryption or identification. Sufficient resistance against all kinds of attacks which aim at retrieval of codes or against uncontrolled change of functionality might need to be implemented. Possible attack scenarios can be grouped in sensing attacks and forcing attacks. Sensing attacks are all trials to get the secret information from a chip (semiconductor device) by measuring certain signals from the chip like current consumption, electromagnetic emission, or voltage probing of signal lines. Forcing attacks try to change the operation conditions and draw conclusions from the resulting behavior of the chip.

While an external communication in such chips can be protected by encryption algorithms, internally the data must be processed in "plain" representation. For performance reasons, strong encryption schemes cannot be used for internal data busses and signals. Hence, probing internal signals or forcing false data to these signals is a critical attack scenario for security circuits.

Signals of data busses are usually driven by logic drivers, in particular simple or tri-state CMOS logic drivers. Such drivers are designed for a well-defined maximum capacitive output load. Probing of the signal status can be done by high resistive voltage measurement, but such a measurement will increase the load capacitance of the driver connected to the probed signal.

The present invention is based on the idea to detect probing and forcing attempts and, in a further embodiment, to generate an internal alarm if such an attack is detected. The detection arrangement or detection sensor is able to check the connected capacity and the actual voltage level of signals. This invention describes an arrangement and method to detect such an additional capacitive load. In addition it is also able to detect externally forced signals, also called over-ruling of signals.

This detection may be performed by comparing two signals at different stages of the driver. Without any attack (e.g. probing), the two signals have the same value only for a maximum predefined period of time. When there is an attack, the load capacitance of the driver will be increased, which corresponds to a longer period in which the two signals have the same value. Thus, by comparing the signals, an increased capacity may be easily detected and thus also a potential attack may be detected.

In the following, further exemplary embodiments of the detection arrangement, the driving unit and the semiconductor device will be explained. However, these embodiments also apply to the detecting method, to the program element and to the computer-readable medium.

The comparison unit may comprise a first comparator for receiving and comparing the first and the second signal and a second comparator for receiving and comparing the first and the second signal.

The comparators may be logic gates. In particular, the first comparator may be a 2-input NOR gate and the second comparator may be a 2-input AND gate.

The first comparator may be adapted to indicate by a first equality signal when the first signal and the second signal are at a first logic value (for instance 0), and wherein the second comparator may be adapted to indicate by a second equality signal when the first signal and the second signal are at a second logic value different to the first logic value (for instance 1).

Each comparator may output an equality signal, which depends on the input signals, i.e., the signals at the first stage and the second stage. As each comparator indicates one specific logic value of the first and the second signal, for instance by an output value of logic 1, the output of both comparators (the first comparator for the logic 1 and the second for the logic 0 or vice versa) may be easily used for detecting how long the first and the second signal have the same value, i.e. are both logic 1 or both logic 0. If the first and the second signal are unequal, the output of both comparators may be logic 0. Thus, if one of the equality signals (i.e. the output of the comparators) has a logic 1, the duration of this logic 1 value may be determined and compared with the predefined threshold. Thus, both comparators may indicate a potential attack.

The comparison unit may further comprise a third comparator for receiving and combining the first and the second equality signal.

The third comparator may combine the both equality signals to one common output. Thus, a potential attack may be indicated by one single signal.

An output of the third comparator may correspond to an alarm signal for raising an alarm in case of a potential attack.

The output of the third comparator may be used as alarm signal. For instance, when the third comparator is an OR gate, an output signal having a logic 1 indicates a potential attack. Also other kind of comparators may be used.

The output of the first comparator may be coupled via a first capacitor to a common line and the output of the second comparator is coupled via a second capacitor to the same common line.

To avoid false alarms during normal switching, the equality signals should be ignored if their duration is shorter than the predefined threshold. This can be done by adding (small) capacitors to the outputs of the first and the second comparator and making the outputs asymmetrically, for instance weak p-MOS and relatively strong n-MOS. Using two separate capacitors may allow tuning of the response time of the comparators versus the threshold time for raising and falling edges at the input of the driver separately.

The common line may be for instance ground or a common supply line like VCC or VDD.

The detection arrangement may further comprise a combining unit being adapted to combine the first and the second equality signal.

Another possible implementation would be to combine the two equality signals to one single signal. This single signal may be used as an alarm signal.

The detection arrangement may further comprise a filtering unit being adapted to receive the output of the combining unit and to filter short pulses from the received signal.

According to this embodiment, short pulses of the equality signals may be filtered so that they will not be considered for the detection of an attack. Short pulses may typically occur due to switching or the like.

The driver may be capable to drive signals being associated with data busses and wires connected to latches of the semiconductor device. The latches may be adapted to store secret information.

As explained above, latches of the semiconductor device may store secret information like keys. The driver being associated with these latches, or with data busses or wires being connected with the latches, should be protected against attacks or at least it should be possible to detect such attacks and to raise an alarm as described by embodiments of the present invention.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

FIG. 3A illustrates a driving unit according to an exemplary embodiment of the invention.

FIG. 3B illustrates signals corresponding to the driving unit of FIG. 3A.

FIG. 4A illustrates a driving unit according to an exemplary embodiment of the invention.

FIG. 4B illustrates signals corresponding to the driving unit of FIG. 4A.

DESCRIPTION OF EMBODIMENTS

Figure 1:
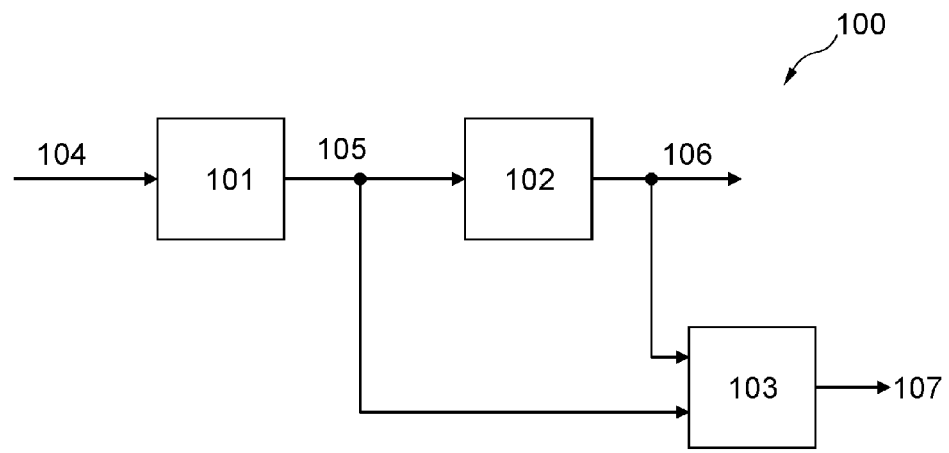
FIG. 1 illustrates a driving unit according to an exemplary embodiment of the invention.

The illustration in the drawing is schematically. In different drawings, similar or identical elements are provided with the same reference signs.

Figures 2A, 2B:
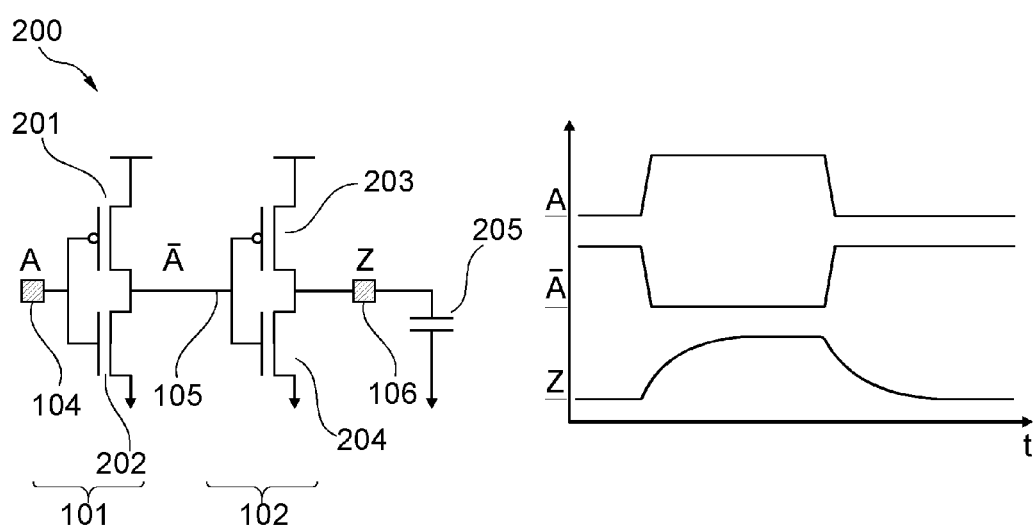
FIG. 2A illustrates a driving unit according to the prior art.
FIG. 2B illustrates signals corresponding to the driving unit of FIG. 2A.

FIG. 2A illustrates a standard signal buffer 200. The input signal 104 is inverted twice. A weak inverter 101 which is built (as an example) out of a p-channel MOS transistor 201 and an n-channel MOS transistor 202 is used to drive the input of a strong inverter 102, also built up of two transistors 203 and 204. The strong inverter is able to charge a maximum specified load capacitance 205 in a certain time. FIG. 2B schematically shows the time dependence of the involved signals. When the input "A" (104) changes its logic state, the internal node "$\overline{A}$" (105) will immediately change to its logical complement value. The output "Z" (106) will toggle to the same logic value as the input (104) but with some delay which depends on the connected capacitance.

In order to detect an attack to the signal, in which case the capacitance value of the load capacitance 205 increases, a detection arrangement 103 within a driving unit 100 can be used as described in FIG. 1.

The detection arrangement 103 comprises a first input terminal which is adapted to receive a first signal being indicative for a signal 105 ($\overline{A}$) at a first stage of the driver (inverting units 101 and 102) of a semiconductor device. The detection arrangement further comprises a second input terminal being adapted to receive a second signal being indicative for a signal 106 (Z) at a second stage of the driver of the semiconductor device. The detection arrangement further comprises comparison unit being adapted to compare the first signal and the second signal and to determine a time period during which the signals are equal. The determined time period is indicative for a potential attack, if the determined time period is above a predefined threshold. An output signal 107 of the detection arrangement can be used as an alarm signal.

As shown in the Figures, for a short time the internally inverted signal "$\overline{A}$" (105) (signal at the first stage) and the output signal "Z" (106) (signal at the second stage) are of the same logic value. The time of equality scales with the connected capacitance. By adding two logic comparators 301, 302 to the circuit as shown in the driving unit 300, 400 of FIGS. 3A and 4A the equality can be checked. As shown in FIGS. 3B and 4B, a 2-input NOR gate 301 shows a logic 1 when "$\overline{A}$" (105) and "Z" (106) are both at logic 0, a 2-input AND gate 302 shows a logic 1 when "$\overline{A}$" (105) and "Z" (108) are both at logic 1. If the output capacitance 205 is less than the specified maximum load capacitance, the duration of the equality signals will be less than a maximum delay time "$t_d$".

To avoid false alarms during normal switching, the equality signals should be ignored if their duration is shorter than "$t_d$". As shown in FIG. 4A, this can be done by adding small capacitors 401, 402 to the outputs of the NOR 301 and AND 302 gates and making the outputs asymmetrically, i.e., weak p-MOS and relatively strong n-MOS. An additional OR gate 403 can combine both equality signals to one common "alarm" or "failure" output "F" (404). Using two separate capacitors may allow tuning the response time versus "$t_d$" for raising and falling edges at input "A" separately. Another possible implementation would be to combine the two equality signals to one single signal and add to the filtering of short expected pulses only once.

An additional advantage of the detection arrangement may be that it may also sense over-ruling attacks, where the output "Z" of the driver is forced to its inverted logic value. In this case "$\overline{A}$" (105) and the output signal "Z" (106) are even longer at same logical value and the failure output "F" (404) may raise an alarm.

The circuit can be layouted in a way that it looks very similar as normal logic gates. The only analog-like part of the schematic is to filter the normal short-time peaks, i.e. the capacitors 401, 402 and weak p-channel MOS transistors in the NOR and AND gates 301, 302. The capacitors can be layouted like normal transistors, a weak p-channel transistor can be realized by a chain of normally sized transistors. This way the layout cannot be recognized as a special security circuit in the logic area of the chip by optical inspection.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A detection arrangement for detecting an attack to internal signals in a semiconductor device, the detection arrangement comprising:

a first input terminal connected to an internal node of a driver of the semiconductor device, a second input terminal connected to an output node of the driver of the semiconductor device, and a comparison unit including:

circuitry including at least one logic comparator configured to generate a first equality signal based upon a comparison of a first signal at the first input terminal to a second signal at the second input terminal, and including a load capacitance configure with a capacitance value that varies in response to the first and second signals during the attack, a filtering unit configured to filter the first equality signal of the at least one logic comparator to generate, in response to a time period of the equality signal exceeding a predefined threshold indicative of a potential attack, an alarm signal, wherein the time period is a function of the capacitance value.

2. The detection arrangement according to claim 1, wherein the comparison unit comprises a first comparator for receiving and comparing the first and the second signal and a second comparator for receiving and comparing the first and the second signal.

3. The detection arrangement according to claim 2, wherein the first comparator is adapted to indicate by the first equality signal when the first signal and the second signal are at a first logic value, and wherein the second comparator is adapted to indicate by a second equality signal when the first signal and the second signal are at a second logic value different to the first logic value.

4. The detection arrangement according to claim 2, wherein the output of the first comparator is coupled via a first capacitor to a common line and the output of the second comparator is coupled via a second capacitor to the same common line.

5. The detection arrangement according to claim 3, wherein the filtering unit is configured to filter both the first and second equality signals and wherein the comparison unit further comprises a third comparator for receiving and combining the first and the second equality signal as filtered by the filtering unit.

6. The detection arrangement according to claim 5, wherein an output of the third comparator corresponds to the alarm signal for raising an alarm in case of a potential attack.

7. The detection arrangement according to claim 3, further comprising a combining unit being adapted to combine the first and the second equality signal.

8. The detection arrangement according to claim 7, wherein the filtering unit being adapted to receive an output signal of the combining unit and to filter short pulses from the received output signal.

9. A semiconductor device comprising:
a driving unit configured to drive signals of data busses internally to the semiconductor device, the driving unit including:
a driver having a first stage corresponding to an internal node between a first inverting unit of the driver and a second inverting unit of the driver and a second stage corresponding to an output node of the driver, the driver including circuitry having a load capacitance configured with a capacitance value that varies in response to signaling indicative of a potential attack, and
a detection arrangement that includes:
a first input terminal connected to the internal node,
a second input terminal connected to the output node, and
a comparison unit including:
at least one logic comparator configured to generate a first equality signal based upon a comparison of a first signal at the first input terminal to a second signal at the second input terminal,
a filtering unit configured to filter the first equality signal of the at least one logic comparator to generate, in response to a time period of the equality signal exceeding a predefined threshold indicative of the potential attack, an alarm signal, wherein the time period is a function of the capacitance value.

10. The device according to claim 9, wherein the driver is capable to drive signals being associated with data busses and wires connected to latches of the semiconductor device.

11. The semiconductor device according to claim 10, wherein the latches are adapted to store secret information.

12. Method of detecting an attack to internal signals in a semiconductor device, the method comprising:
receiving, by a first input terminal of a detection arrangement, a first signal being indicative for a signal at a first stage of a driver of the semiconductor device, the driver being capable to drive signals internally to the semiconductor device,
receiving, by a second input terminal of the detection arrangement, a second signal being indicative for a signal at a second stage of the driver of the semiconductor device,
varying a capacitance value of a load capacitance in response to and based on a combination of energy from the received first and second signals,
comparing, by a comparison unit, the first signal and the second signal and determining a time period during which the signals are equal,
generate an equality signal based upon the comparing of a first signal and the second signal, and
filter the equality signal to generate, in response to a time period of the equality signal exceeding a predefined threshold indicative of a potential attack, an alarm signal, wherein the time period is a function of the capacitance value.

\* \* \* \* \*